(12) United States Patent
Haidong et al.

(10) Patent No.: US 10,800,347 B2
(45) Date of Patent: Oct. 13, 2020

(54) HOLDER OF A VEHICLE-MOUNTED CAMERA, MANUFACTURING METHOD AND MOUNTING METHOD

(71) Applicant: VALEO INTERIOR CONTROLS (SHENZHEN) CO. LTD, Shenzhen (CN)

(72) Inventors: Wang Haidong, Shenzhen (CN); Colin Hehir, Shenzhen (CN)

(73) Assignee: VALEO INTERIOR CONTROLS (SHENZHEN) CO. LTD, Shenzhen (CN)

( * ) Notice: Subject to any disclaimer, the term of this patent is extended or adjusted under 35 U.S.C. 154(b) by 0 days.

(21) Appl. No.: 16/209,034

(22) Filed: Dec. 4, 2018

(65) Prior Publication Data
US 2019/0168686 A1   Jun. 6, 2019

(30) Foreign Application Priority Data
Dec. 5, 2017   (CN) .......................... 2017 1 1268231

(51) Int. Cl.
*B60R 11/04*   (2006.01)
*F16M 13/02*   (2006.01)

(52) U.S. Cl.
CPC ............ *B60R 11/04* (2013.01); *F16M 13/022* (2013.01)

(58) Field of Classification Search
CPC ............ B60R 11/04; B60R 2011/0075; B60R 2011/0052; B60R 2011/0063; F16M 13/022; G03B 17/561
See application file for complete search history.

(56) References Cited

U.S. PATENT DOCUMENTS

| 2018/0027155 A1* | 1/2018 | Nakamura ............... G02B 7/02 348/374 |
| 2019/0052782 A1* | 2/2019 | Sung ...................... G03B 17/08 |

\* cited by examiner

*Primary Examiner* — Padma Haliyur
(74) *Attorney, Agent, or Firm* — Osha Liang LLP

(57) ABSTRACT

The present disclosure provides a holder of a vehicle-mounted camera, a manufacturing method and a mounting method. The holder of the vehicle-mounted comprises: an aligning part, a position of which is determined based on a position of a lens of the camera such that the lens is centered in the opening; and a fastener for fixing the holder of the vehicle-mounted camera to the body. The position of the aligning part is determined based on the position of the lens of the vehicle-mounted camera, thereby ensuring that the lens of the camera assembly is evenly spaced apart relative to the opening of the body of the vehicle, and improving aesthetics.

17 Claims, 3 Drawing Sheets

HOLDER OF A VEHICLE-MOUNTED CAMERA, MANUFACTURING METHOD AND MOUNTING METHOD

FIELD

The present disclosure relates to vehicle-mounted cameras, and more specifically to a holder of a vehicle-mounted camera, a manufacturing method thereof and a method for mounting the vehicle-mounted camera to a body of the vehicle.

BACKGROUND

Vehicle-mounted imaging systems are usually provided on vehicles such as automobiles to provide drivers with information about the environment (such as obstacles) around the vehicle. The imaging system includes at least one camera assembly mounted to the vehicle body. However, in the prior art, in order to ensure a sharpness of the image, a lens and an image sensor should be aligned, so that a large gap is reserved around the lens. The lens is often eccentric from a circular opening provided in the vehicle body when the camera is mounted to the vehicle body. The conventional solution is not satisfactory. It would be desirable to provide improvements to the conventional mounting solution of camera assemblies.

SUMMARY

An objective of the present disclosure is to provide a holder of a vehicle-mounted camera, which can at least alleviate or solve one of the above-mentioned problems.

According to a first aspect of the present disclosure, there is provided a holder of a vehicle-mounted camera for attaching the camera to a body of the vehicle provided with an opening. The holder comprises an aligning part, a position of which is determined based on a position of a lens of the camera such that the lens is centered in the opening; and a fastener for fixing the holder of the vehicle-mounted camera to the body.

In some embodiments of the present disclosure, the aligning part comprises at least two holes provided in the holder of the vehicle-mounted camera.

In some embodiments of the present disclosure, the holder of the vehicle-mounted camera further comprises a bracket defining a cavity for receiving the camera.

In some embodiments of the present disclosure, the aligning part comprises at least two holes provided in the bracket.

In some embodiments of the present disclosure, the camera is removably attached to the bracket such that the camera is sandwiched between the bracket and the body.

In some embodiments of the present disclosure, the camera is snap-fitted into the bracket.

In some embodiments of the present disclosure, the fastener includes at least one screw and the bracket is provided with at least a screw hole for engaging with the at least one screw.

In some embodiments of the present disclosure, the holder is integrated with the camera.

In some embodiments of the present disclosure, the aligning part comprises at least two holes provided in the camera.

In some embodiments of the present disclosure, the camera comprises a pair of lugs laterally extending from a back cover of the camera.

In some embodiments of the present disclosure, the at least two holes are provided in the pair of lugs respectively.

In some embodiments of the present disclosure, the fastener includes at least one screw and the lug is provided with at least a screw hole for engaging with the at least one screw.

According to a second aspect of the present disclosure, there is provided a method for manufacturing the above-mentioned holder of a vehicle-mounted camera. The method comprises: providing an aligning part, a position of which is determined based on a position of a lens of the camera such that the lens is centered in an opening; and providing a fastener for fixing the holder of the vehicle-mounted camera to the body.

In some embodiments of the present disclosure, the method for manufacturing the holder of a vehicle-mounted camera further comprises: determining a dimension of the position of the aligning part based on a predetermined specification of the opening in the body of the vehicle.

According to a third aspect of the present disclosure, there is provided a method for mounting a vehicle-mounted camera to a body of a vehicle. The method comprises: holding the vehicle-mounted camera by the above-mentioned holder of a vehicle-mounted camera; aligning the aligning part of the holder to a respective aligning part of the body; and fixing the holder to the body by the fastener.

With the holder of the vehicle-mounted camera, the manufacturing method, and the mounting method of the present disclosure, the position of the aligning part is determined based on the position of the lens of the vehicle-mounted camera, rather than based on the position of the opening of the body of the vehicle for receiving the camera assembly, thereby ensuring that the lens of the camera assembly is evenly spaced apart relative to the opening of the body of the vehicle, with improved aesthetics.

It to be understood that the above-described embodiments are illustrative and not limiting, and that those skilled in the art can devise various alternative embodiments without departing from the scope of the appended claims. Moreover, the various aspects described above can be combined to provide additional advantages.

It is to be understood that all combinations of the foregoing concepts and additional concepts discussed in detail below may be considered as a part of the inventive subject matter of the present disclosure if these concepts are not contradictory to each other. In particular, all combinations of the claimed subject matter of the present disclosure may be considered as part of the inventive subject matter of the present disclosure. It is to be understood that the terms used in any document that is explicitly used herein and which may be incorporated herein by reference should be endowed the meaning most consistent with the particular concepts disclosed herein.

BRIEF DESCRIPTION OF THE DRAWINGS

The above objectives, features, and advantages of the present disclosure can be better understood by the following embodiments of the present disclosure described in conjunction with the accompanying drawings in which.

In the figures, the same or like reference numerals indicate the same or like parts.

DETAILED DESCRIPTION

Exemplary embodiments of the present disclosure will now be described in more detail with reference to the figures. Although the example embodiments are illustrated in the figures, it is to be understood that the disclosure may be implemented in various manners and not limited to the embodiments described herein. Rather, the embodiments are provided herein to make the disclosure more apparent and complete, and to convey the scope of the present disclosure to those skilled in the art.

Figure 1:
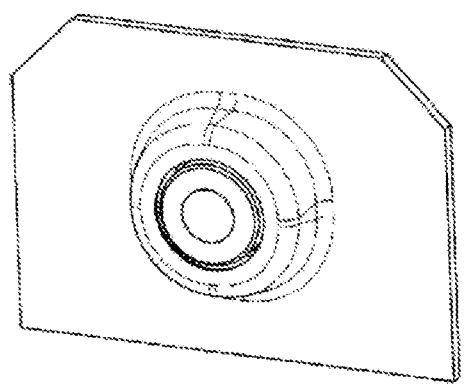
FIG. 1 shows a drawback of a conventional camera assembly when mounted to a body of a vehicle.

As shown in FIG. 1, in a vehicle-mounted imaging system, a lens of a camera assembly needs to be installed through an opening of the body of the vehicle. In conventional solutions, the lens first extends through the circular opening of the body of the vehicle, and then a bracket carrying the camera assembly is fastened to the body of the vehicle by fasteners such as screws. However, in order to make the lens extend through the opening easier, an inner diameter of the opening is generally larger than the outer diameter of the lens. When the bracket carrying the camera assembly is fastened to the body of the vehicle, this may cause the lens of the camera assembly to be eccentric from the opening of the body of the vehicle. A gap left between the periphery of the lens and the opening is not uniform which affect appearance.

As for the above problems, the inventor has made a keen study and found the following main reasons for eccentricity of the lens of the camera assembly and the opening of the body of the vehicle. As for the holder of the vehicle-mounted camera, a fastening hole is generally pre-formed at a pre-determined position of the holder of the vehicle-mounted camera according to a predetermined size (for example, based on the size of the opening of the body of the vehicle). However, since molded precision of the holder of the vehicle-mounted camera is insufficient, it is difficult to ensure that a dimension formed in the holder of the vehicle-mounted camera completely matches the dimension of the opening of the body of the vehicle. When the holder of the vehicle-mounted camera is mounted with the opening of the body of the vehicle, the lens of the camera assembly is eccentric from the opening of the body of the vehicle, and the gap left therebetween is not even. In addition, as for different holders of vehicle-mounted cameras, even though fastening positions are formed based on the same predetermined size, the concentricity of the cameras carried by different holders and the opening of the body of the vehicle is different due to manufacturing tolerances, which further destroys pleasant appearance. One solution to this problem is to improve manufacture precision of the holder of the vehicle-mounted camera. However, this is not a good option since this will significantly increase the manufacturing cost of the holder of the vehicle-mounted camera.

In view of the above, the present disclosure proposes a novel solution that is simple and easy to implement, and can effectively solve the above technical problems. It is to be understood that although the present application is illustrated by taking a camera assembly as an example, those skilled in the art will appreciate that components to be installed may be other functional components such as detection devices, sensors, and the like. Moreover, although the present application has been described by way of an automobile, it will be understood by those skilled in the art that this is merely exemplary, and the object carrying the functional component may be any device provided with an opening. Further, although the description describes the position for mounting the functional component by taking the body of the vehicle as an example, it is to be understood that this is merely exemplary, and the position where the functional component is mounted may be any other suitable portion of the automobile.

Embodiments of the present disclosure will be described in detail below with reference to the figures.

Figure 2:
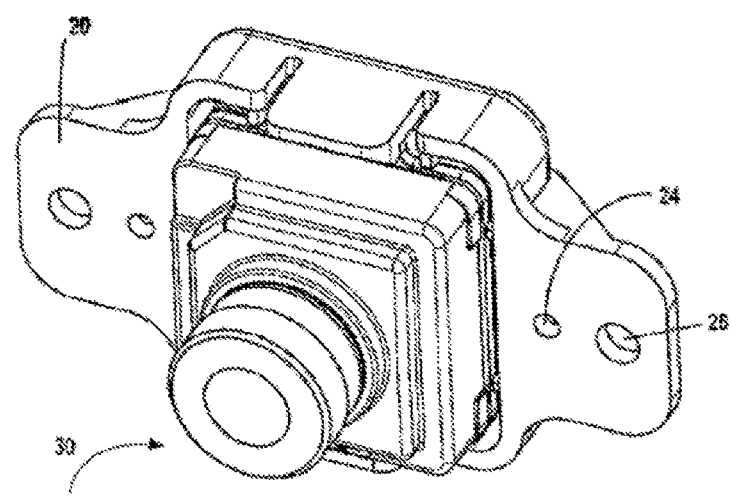
FIG. 2 shows a structural schematic view of a holder of a vehicle-mounted camera according to an embodiment of the present disclosure.
Figure 3:
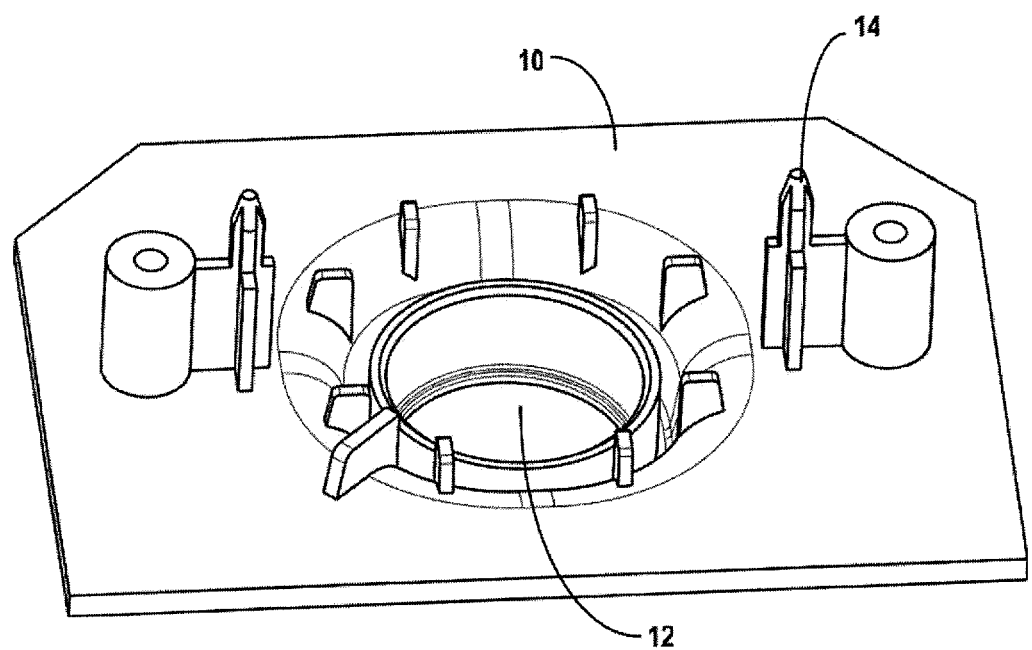
FIG. 3 shows a partial schematic view of a body of a vehicle for carrying the holder of the vehicle-mounted camera according to an embodiment of the present disclosure.
Figure 4:
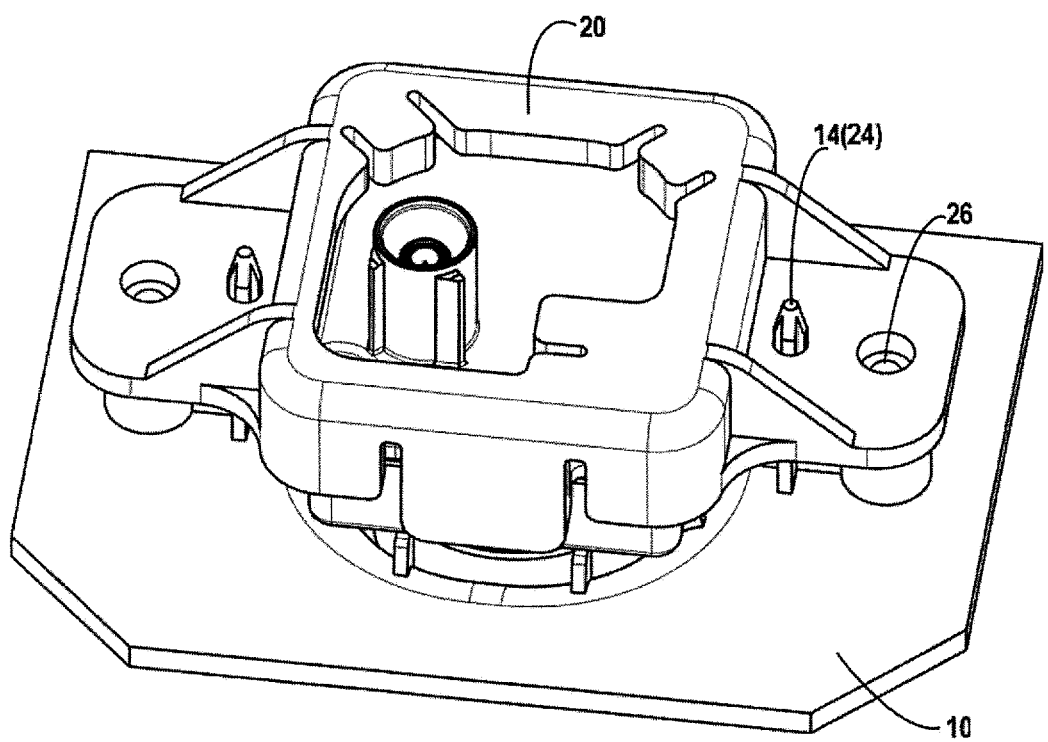
FIG. 4 shows a structural schematic view in which the holder of the vehicle-mounted camera according to an embodiment of the present disclosure is assembled with the body of the vehicle of FIG. 3.

FIGS. 2 to 4 illustrate a first embodiment of a holder of a vehicle-mounted camera according to the present disclosure. As shown, the holder of the vehicle-mounted camera according to the first embodiment of the present disclosure includes a bracket 20 that carries a camera assembly. The camera assembly is mounted to the body 10 of the vehicle via the bracket 20.

As shown, the bracket 20 includes an aligning part and a fastener 14. The aligning part is used to determine a relative position between the bracket (including the camera) and the body 10 of the vehicle. After the relative position is determined, the bracket and the body 10 are fixed to each other by the fasteners 14.

In the holder of the vehicle-mounted camera according to the present disclosure, the position of the aligning part is determined based on the position of the lens of the vehicle-mounted camera, rather than based on the position of the opening of the body for mounting the vehicle-mounted camera. Therefore, regardless of the manufacturing tolerance of the bracket, it is always possible to ensure that the dimension between the aligning part and the lens is fixed. When the bracket 20 are mounted to the body of the vehicle, so long as the aligning part of the bracket is aligned with the corresponding portion of the body of the vehicle, it is always possible to ensure that the relative positions between the bracket 20 and the lens are fixed. Thereby, relative positions between the lens and the opening of the body are fixed. If the position of the aligning part is determined based on the position of the opening of the body for mounting the camera assembly, different concentricity between the camera lens and the opening of the body impairs the pleasant appearance due to manufacturing tolerances of the bracket 20.

According to the solution of the present disclosure, the position of the aligning part is determined such that the lens is positioned at the center of the opening 12. In this manner, when the holder of the vehicle-mounted camera is mounted with the opening of the body, the lens of the camera assembly is concentric with the opening of the body with a uniform gap.

In the illustrated embodiment, the aligning part includes at least two holes 24 disposed on the holder of the vehicle-mounted camera. The size of the holder of the vehicle-mounted camera can be determined in a certain direction using at least two holes 24 enables, whereby the relative position of the holder of the vehicle-mounted camera and the body 10 can be accurately determined by means of at least two holes 24. It is to be understood that the number of holes is merely exemplary, and multiple holes, such as three holes or four holes, may be utilized to meet positioning requirements.

It is to be understood that although in the illustrated embodiment the aligning part is shown as a hole, the aligning part may be, for example, a recess, a depression or a pit. Further, the aligning part on the holder of the vehicle-mounted camera is a member that is aligned with the corresponding member on the body of the vehicle. In the case where the corresponding member on the body is a hole, the aligning part may be formed in the shape of a pillar or a protrusion. Thus, the features of the aligning part can be designed accordingly based on the characteristics of the alignment features on the body of the vehicle. All of these variations fall within the spirit of the present invention.

In the illustrated embodiment, the holder of the vehicle-mounted camera includes a bracket 20 that defines a cavity adapted to receive the vehicle-mounted camera. In the illustrated embodiment, the bracket 20 defines a cavity adapted to receive a body of the camera assembly 30. A main body of the camera assembly is assembled within the cavity. The cavity of the bracket 20 is shaped to fit the contour of the main body of the camera assembly 30. Thereby, the bracket 20 and the main body of the camera assembly 30 are fitted together in a form-fitting manner. In this manner, the mounting and dismounting of the camera assembly 30 can be facilitated.

In some embodiments, the cavity of the bracket 20 does not form a form fit with the camera assembly 30, but merely houses the camera assembly 30 therein. Inner walls of the cavity of the bracket limit transverse movement of the camera assembly 30. In another embodiment not shown, the camera assembly 30 can be fastened to the bracket 20 by fasteners. Although in the illustrated embodiment, the bracket 20 can define a form of cavity, the shape of the bracket is not limited in any way, for example, the bracket can be formed in any shape that provides protection to the camera assembly 30.

In the illustrated embodiment, the fastener is a screw. A hole 26 may be provided at a suitable position in the bracket 20 and the body 10. The bracket 20 and the body 10 of the vehicle are fastened together by screws. There is no limitation on the number of screws, and an appropriate number of screws can be selected depending on the shape of the bracket 20 and the body 10. The screws are merely exemplary, and other joining manners such as rivets, bolts, bonds or form-fitting may also be utilized. In the illustrated embodiment, the body 10 is a panel. It is to be understood that this is merely exemplary and that the body may be in other shapes, such as a vehicle beam.

Figure 5:
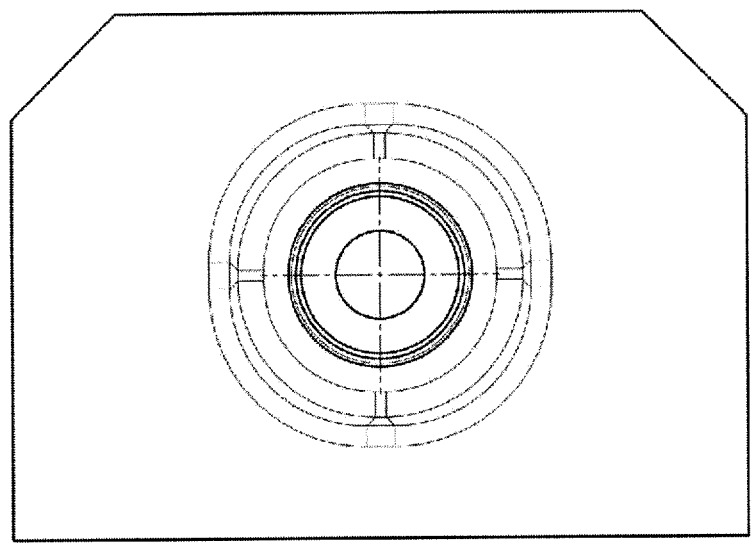
FIG. 5 shows a plane view after the holder of the vehicle-mounted camera according to an embodiment of the present disclosure is attached to the body of the vehicle.

FIG. 5 illustrates a plane view after the holder of the vehicle-mounted camera is mounted with the body of the vehicle in accordance with an embodiment of the present disclosure. As shown in FIG. 5, regardless of the manufacturing accuracy of the holder of the vehicle-mounted camera, it is always possible to ensure a uniform gap between the camera lens and the opening of the body. Furthermore, the gap between the lens of the camera assembly 30 and the aperture of the housing can be suitably controlled, for example, being minimized to further enhance the aesthetics of the camera assembly installation.

Figure 6:
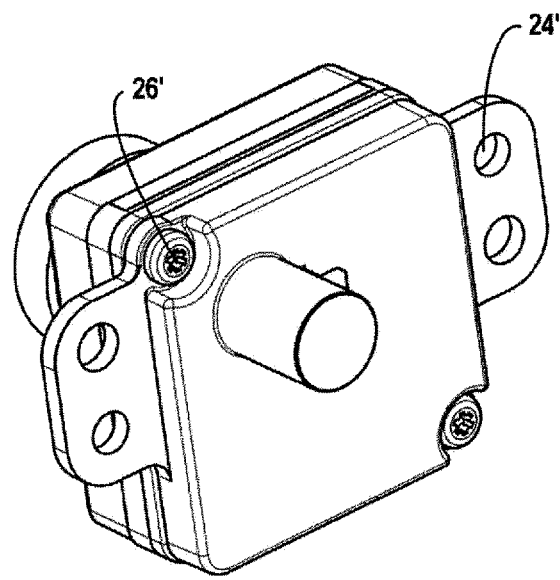
FIG. 6 shows a structural schematic view of a holder of a vehicle-mounted camera according to another embodiment of the present disclosure.

FIG. 6 illustrates a second embodiment of the holder of the vehicle-mounted camera in accordance with the present disclosure. In the second embodiment according to the present disclosure, the holder is integrally formed with the vehicle-mounted camera. In other words, the housing of the vehicle-mounted camera is part of the holder of the vehicle-mounted camera In the illustrated embodiment, the aligning part includes at least two holes 24' formed in the vehicle-mounted camera. Similar to the foregoing description regarding the hole 24, the relative position between the holder of the vehicle-mounted camera and the body 10 of the vehicle can be accurately determined by the hole 24'. Similarly, the number of holes is merely exemplary and multiple holes may be utilized to meet positioning requirements.

In the illustrated embodiment, the vehicle-mounted camera includes a pair of lugs that protrude laterally from a back cover of the vehicle-mounted camera. It is to be understood that the location in which the lugs are formed and the shape of the lugs are merely exemplary, and the lugs may be positioned, for example, at top or bottom to implement the inventive concepts of the present disclosure.

In the illustrated embodiment, the fastener is a screw and the lug is provided with at least one hole 26' that receives the fastener. As previously described with respect to the hole 26, a threaded connection is merely exemplary, and other engagement means may be utilized, such as rivets, bolts, bonds, form-fitting, or the like. Since the aligning part and the fastening portion of the second embodiment are substantially the same as those of the first embodiment, a repetitive description thereof will be omitted.

According to a second aspect of the present disclosure, there is also provided a method for manufacturing a holder of a vehicle-mounted camera. The method comprises: providing an aligning part, the position of the aligning part being determined based on a position of a lens of the vehicle-mounted camera, such that the lens is centered in the opening; and providing fasteners for fastening the holder to the body of the vehicle. Similar to the technical effects achieved above with respect to the holder of the vehicle-mounted camera, the method of manufacturing the holder of the vehicle-mounted camera according to the present application can also ensure uniformity of the gap between the camera lens and the opening of the body.

According to an embodiment of the present disclosure, a method for manufacturing the holder of the vehicle-mounted camera further comprises: determining a dimension of the position of the aligning part based on a predetermined specification of the opening in the body of the vehicle. In some embodiments, the predetermined specification may be, for example, a size provided by an automobile manufacturer.

According to a third aspect of the present disclosure, there is provided a method for mounting a vehicle-mounted camera to a body of a vehicle. The method comprises: holding the vehicle-mounted camera by the above-mentioned holder of a vehicle-mounted camera; aligning the aligning part of the holder to a respective aligning part of the body; and fixing the holder to the body by the fastener. Similarly, according to the mounting method of the present application, it is also possible to ensure uniform gap between the camera lens and the opening of the body of the vehicle.

Although the above-described embodiments have been described and illustrated above, variations to the disclosed embodiments can be understood and effected by the skilled person in practicing the claimed invention, from a study of the drawings, the disclosure, and the appended claims. In the claims, the word "comprises" or "comprising" does not exclude other elements or steps, and the indefinite article "a" or "an" does not exclude a plurality. The mere fact that certain measures are recited in mutually different dependent claims does not indicate that a combination of these measures cannot be used to advantage. Reference sign in claims cannot be used to construe limitations to the extent of protection.

We claim:

1. A holder of a vehicle-mounted camera for attaching the camera to a body of the vehicle provided with an opening, comprising:
    an aligning part, a position of which is determined based on a position of a lens of the camera such that the lens is centered in the opening of the body with a uniform gap;
    a fastener for fixing the holder of the vehicle-mounted camera to the body; and
    a bracket defining a cavity for receiving the camera, wherein inner walls of the cavity limit transverse movement of the camera,
    wherein the aligning part comprises one or more protrusions extending from the body to the bracket to space the bracket a distance from the body, and
    wherein the uniform gap between the lens of the camera and the opening of the body is controlled to be minimized.

2. The holder of claim 1, wherein the aligning part comprises at least two holes provided in the holder of the vehicle-mounted camera.

3. The holder of claim 1, wherein the aligning part comprises at least two holes provided in the bracket.

4. The holder of claim 1, wherein the camera is removably attached to the bracket such that the camera is sandwiched between the bracket and the body.

5. The holder of claim 4, wherein the camera is snap-fitted into the bracket.

6. The holder of claim 1, wherein the fastener includes at least one screw and the bracket is provided with at least a screw hole for engaging with the at least one screw.

7. The holder of claim 1, wherein the holder is integrated with the camera.

8. The holder of claim 1, wherein the aligning part comprises at least two holes provided in the camera.

9. The holder of claim 8, wherein the camera comprises a pair of lugs laterally extending from a back cover of the camera.

10. The holder of claim 9, wherein the at least two holes are provided in the pair of lugs respectively.

11. The holder of claim 9, wherein the fastener includes at least one screw and the lug is provided with at least a screw hole for engaging with the at least one screw.

12. A method for manufacturing the holder of a vehicle-mounted camera of claim 1, comprising:
    providing a bracket defining a cavity for receiving the camera, wherein inner walls of the cavity limit transverse movement of the camera;
    providing an aligning part, a position of which is determined based on a position of a lens of the camera such that the lens is centered in an opening of a body of the vehicle with a uniform gap, wherein the aligning part comprises one or more protrusions extending from the body to the bracket to space the bracket a distance from the body; and
    providing a fastener for fixing the holder of the vehicle-mounted camera to the body,
    wherein the uniform gap between the lens of the camera and the opening of the body is controlled to be minimized.

13. The method of claim 12, further comprising determining a dimension of the position of the aligning part based on a predetermined specification of the opening in the body of the vehicle.

14. A method for mounting a vehicle-mounted camera to a body of a vehicle, comprising:
    holding the vehicle-mounted camera by the holder of a vehicle-mounted camera of claim 1;
    aligning the aligning part of the holder to a respective aligning part of the body; and
    fixing the holder to the body by the fastener.

15. The holder of claim 2, wherein one of the at least two holes of the aligning part is provided in the one or more protrusions.

16. The holder of claim 3, wherein the one or more protrusions align with one of the at least two holes provided in the bracket.

17. The holder of claim 1, wherein the cavity of the bracket is shaped to fit a contour of a main body of the camera.

* * * * *